(12) United States Patent
Sato

(10) Patent No.: US 12,428,786 B2
(45) Date of Patent: Sep. 30, 2025

(54) FOOD CONTAINER AND PAPER PRODUCT

(71) Applicants: KOJYUNSYA CO., LTD., Tokyo (JP); Toshihiko Sato, Saitama (JP)

(72) Inventor: Toshihiko Sato, Saitama (JP)

(73) Assignees: Toshihiko Sato, Saitama (JP); MARKETVISION CO., LTD., Tokyo (JP)

(*) Notice: Subject to any disclaimer, the term of this patent is extended or adjusted under 35 U.S.C. 154(b) by 566 days.

(21) Appl. No.: 17/759,014

(22) PCT Filed: Feb. 17, 2020

(86) PCT No.: PCT/JP2020/005969
§ 371 (c)(1),
(2) Date: Jul. 18, 2022

(87) PCT Pub. No.: WO2021/166017
PCT Pub. Date: Aug. 26, 2021

(65) Prior Publication Data
US 2023/0033079 A1 Feb. 2, 2023

(51) Int. Cl.
*B65D 65/42* (2006.01)
*B65D 65/46* (2006.01)
*D21H 19/12* (2006.01)
*D21H 21/16* (2006.01)

(52) U.S. Cl.
CPC ............. *D21H 19/12* (2013.01); *D21H 21/16* (2013.01); *B65D 2565/385* (2013.01)

(58) Field of Classification Search
CPC ............ B65D 2565/385; B65D 65/466; D21H 17/24; D21H 27/10; Y02W 30/80
See application file for complete search history.

(56) References Cited

U.S. PATENT DOCUMENTS

2016/0122568 A1* 5/2016 Catchmark ............... C08L 1/02
106/162.2
2016/0331000 A1 11/2016 Sawamura

FOREIGN PATENT DOCUMENTS

| CN | 106136213 A | 11/2016 |
|----|-------------|---------|
| JP | S60-221054 A | 11/1985 |
| JP | S2-270601 A | 11/1987 |

(Continued)

OTHER PUBLICATIONS

PCT, International Search Report for the corresponding application No. PCT/JP2020/005969, dated Mar. 31, 2020, with English translation.

(Continued)

*Primary Examiner* — Laura A Auer
(74) *Attorney, Agent, or Firm* — LUCAS & MERCANTI, LLP

(57) ABSTRACT

An object is to provide a food container and a paper product which are water resistant, oil resistant, and recyclable. Provided is a food container obtained by mixing and stirring water, konjac mannan, and an alkali to liberate an acetyl group to obtain modified mannan whose swelling is suppressed, releasing suppression of swelling of the modified mannan by neutralization to obtain neutral or acidic modified mannan, solating or gelating the neutral or acidic modified mannan, applying the solated mannan sol or the gelated mannan gel to a paper food container, and drying the mannan sol or the mannan gel.

7 Claims, 11 Drawing Sheets

(56) References Cited

FOREIGN PATENT DOCUMENTS

| JP | H06-341077 | A | 12/1994 |
| JP | 2002-355918 | A | 12/2002 |
| JP | 2004051183 | A | 2/2004 |
| JP | 2004-329089 | A | 11/2004 |
| JP | 2010-150542 | A | 7/2010 |
| JP | 2011-72304 | A | 4/2011 |
| JP | 201695583 | A | 5/2016 |
| JP | 6089308 | B2 | 3/2017 |

OTHER PUBLICATIONS

Dynic Corporation, "Production of Marufu," Internet, https://www.dynic.co.jp/company/80/chno3/ch03-3.html retrieved on Jul. 15, 2022, with machine English translation.

Office Action dated Dec. 23, 2022 for the corresponding Japanese patent application No. 2022-501397, with English translation (6 pages).

Extended European Search Report, dated Jul. 26, 2023, issued for the corresponding European Patent Application No. 20920546.7, 7 pages.

Office Action, dated Mar. 19, 2024, issued for the corresponding European Patent Application No. 20920546.7, 3 pages.

Office Action, dated Aug. 29, 2023, issued for the corresponding Canadian Patent Application No. 3,161,554, 3 pages.

Office Action, issued Jan. 23, 2024 for the corresponding Chinese Patent Application No. 202080096579.X, 13 pages, with English translation.

Office Action, issued Jul. 4, 2024 for the corresponding Chinese Patent Application No. 202080096579.X, 18 pages, with English translation.

Office Action, dated Mar. 29, 2023, issued for the corresponding Japanese Patent Application No. 2022-501397, 7 pages, with English translation.

Office Action, dated Jul. 12, 2024, issued for the corresponding Japanese Patent Application No. 2023-102617, 11 pages, with English translation.

Yang Ying, et al., Determines on Viscosity and Density of Konjac Flour and Konjac Glucomannan, Chinese Journal of Drug Application and Monitoring, 2007, No. 1, pp. 44-46, with English abstract.

Office Action, dated Dec. 10, 2024, issued for the corresponding Japanese Patent Application No. 2023-102617, 8 pages, with English translation.

* cited by examiner

Fig. 1

| TEST PRODUCT | | MINERAL WATER | | COFFEE BEVERAGE | | ORANGE JUICE | | HOUSEHOLD OIL | | SAKE | | COLA | |
|---|---|---|---|---|---|---|---|---|---|---|---|---|---|
| MANNAN pH | APPLICATION AMOUNT | EXUDATION OCCURS | EXUDATION DOES NOT OCCUR | EXUDATION OCCURS | EXUDATION DOES NOT OCCUR | EXUDATION OCCURS | EXUDATION DOES NOT OCCUR | EXUDATION OCCURS | EXUDATION DOES NOT OCCUR | EXUDATION OCCURS | EXUDATION DOES NOT OCCUR | EXUDATION OCCURS | EXUDATION DOES NOT OCCUR |
| NEUTRAL (ABOUT pH 7.0) | BASE SHEET (APPLICATION AMOUNT IS ZERO) | ○ | | ○ | | ○ | | ○ | | ○ | | ○ | |
| | 50.3μm | | ○ | | ○ | ○ | | ○ | | ○ | | ○ | |
| | 100.6μm | | ○ | | - | | - | ○ | | ○ | | ○ | |
| | DOUBLE-APPLIED (201.2μm) | | - | | - | | ○ | | ○ | | ○ | | ○ |
| ACIDIC (ABOUT pH 4.5) | BASE SHEET (APPLICATION AMOUNT IS ZERO) | ○ | | ○ | | ○ | | ○ | | ○ | | ○ | |
| | 50.3μm | | ○ | | ○ | ○ | | ○ | | ○ | | ○ | |
| | 100.6μm | | ○ | | - | | - | ○ | | ○ | | ○ | |
| | DOUBLE-APPLIED (201.2μm) | | - | | - | | ○ | | ○ | | ○ | | ○ |

Fig. 2

| MANNAN pH | APPLICATION AMOUNT | 98°C HIGH TEMPERATURE COFFEE BEVERAGE | | VANILLA ICE CREAM | | NORMAL TEMPERATURE TEA | | 98°C HIGH TEMPERATURE TEA | |
|---|---|---|---|---|---|---|---|---|---|
| | | EXUDATION OCCURS | EXUDATION DOES NOT OCCUR | EXUDATION OCCURS | EXUDATION DOES NOT OCCUR | EXUDATION OCCURS | EXUDATION DOES NOT OCCUR | EXUDATION OCCURS | EXUDATION DOES NOT OCCUR |
| NEUTRAL (ABOUT pH 7.0) | BASE SHEET (APPLICATION AMOUNT IS ZERO) | ○ | | ○ | | ○ | | ○ | |
| | 50.3 μm | | ○ | | ○ | | ○ | | ○ |
| | 100.6 μm | — | | — | | | ○ | | ○ |
| | DOUBLE-APPLIED (201.2 μm) | — | | — | | — | | — | |
| ACIDIC (ABOUT pH 4.5) | BASE SHEET (APPLICATION AMOUNT IS ZERO) | ○ | | ○ | | ○ | | ○ | |
| | 50.3 μm | | ○ | | ○ | | ○ | | ○ |
| | 100.6 μm | — | | — | | | ○ | | ○ |
| | DOUBLE-APPLIED (201.2 μm) | — | | — | | — | | — | |

Fig. 3

| | QUESTION | CONTAINER TO WHICH NEUTRAL MANNAN IS APPLIED | CONTAINER TO WHICH ACIDIC MANNAN IS APPLIED | ORIGINAL CONTAINER |
|---|---|---|---|---|
| 1 | ASTRINGENCY IS FELT AS COMPARED WITH MINERAL WATER | 0 PERSONS | 0 PERSONS | 0 PERSONS |
| 2 | BITTERNESS IS FELT AS COMPARED WITH MINERAL WATER | 1 PERSON | 2 PERSONS | 2 PERSONS |
| 3 | A STRANGE SMELL/SCENT IS FELT AS COMPARED WITH MINERAL WATER | 1 PERSON | FOUR PERSONS | 2 PERSONS |
| 4 | THE TASTE IS THE SAME AS MINERAL WATER, AND A DIFFERENCE FROM MINERAL WATER IS NOT FELT | 12 PERSONS | EIGHT PERSONS | TEN PERSONS |
| 5 | OTHERS (SWEETNESS IS SLIGHTLY FELT, OR A PAPER SMELL IS FELT) | 1 PERSON | 1 PERSON | 1 PERSON |

FOOD CONTAINER AND PAPER PRODUCT

CROSS REFERENCE TO RELATED APPLICATION

This Application is a 371 of PCT/JP2020/005969 filed on Feb. 17, 2020, the above application is incorporated herein by reference.

TECHNICAL FIELD

The present invention relates to a food container and a paper product which are water resistant, oil resistant, and recyclable.

BACKGROUND ART

At present, a plastic food container, straw, and the like are used in various situations. They are excellent in water resistance and oil resistance, and can be used for various foods and beverages, and therefore are highly convenient. On the other hand, an environmental problem regarding disposal of the plastic food container and straw has been indicated.

For example, in the United States, plastic waste has been buried in soil. However, most of plastic waste is not naturally decomposed, and therefore is accumulated in soil. On the other hand, in developing countries, there are more cases where plastic waste is directly discarded in a river and the sea, and this has a large adverse effect on the sea ecosystem.

Along with the indication of such an environmental problem, there is an increasing trend worldwide to eliminate use of a plastic food container. For example, a world famous coffee chain store or fast food store aims to eliminate use of a plastic straw. In addition, a certain family restaurant in Japan has already eliminated use of a plastic straw in principle, has switched to use of an alternative straw using a plastic material that can be naturally decomposed or a food material, and has actively promoted development of a food container using a food material.

As an alternative to a conventional plastic straw or food container, there is a method using a plastic material that can be naturally decomposed or a food material. However, although a load on the environment is reduced, a manufacturing unit price of the material is significantly higher than before.

In addition, there is also a method for subjecting a paper container to polyethylene film laminate processing. However, with this method, not only a manufacturing unit price is significantly higher than before, but also the paper container is not recyclable in spite of the paper product because the paper container has been subjected to laminate processing. Therefore, the paper container that has been subjected to laminate processing has to be incinerated, and has a large load on the environment.

As described above, the method using a plastic material that can be naturally decomposed or a food material, which is considered as an alternative to a plastic food container or straw, has a problem that a manufacturing unit price of the material is high. In addition, the method for subjecting a paper container to laminate processing has an environmental problem that the paper container is not recyclable in addition to a high manufacturing unit price.

Therefore, as a countermeasure at a relatively low cost, it is conceivable to apply a konjac glue, which has been conventionally known to have water resistance, to paper, or to utilize a konjac film, a konjac laminate, or the like. As a technique for bonding a konjac film to a paper container, there is a technique described in Patent Literature 1 below.

In addition, Non Patent Literature 1 below describes that a konjac glue is used as an adhesive for bonding Japanese paper.

CITATION LIST

Patent Literature

Patent Literature 1: JP 2002-355918 A

Non Patent Literature

Non Patent Literature 1: DYNIC CORPORATION, "Production of Marufu", [online], Internet <URL: https://www.dynic.co.jp/company/80/chno3/ch03-3.html.>

SUMMARY OF INVENTION

Technical Problem

The technique described in Patent Literature 1 is a technique for bonding a deacetylated konjac film to paper. This makes it possible to obtain water resistant paper at a lower cost. However, since the deacetylated konjac film itself has alkalinity, when a paper product manufactured by the technique described in Patent Literature 1 is used for a food container, a konjac smell, a harsh taste, astringency, and the like are generated. Therefore, a paper product using the technique described in Patent Literature 1 cannot be used for a food container or the like.

In addition, in Non Patent Literature 1, since the konjac glue is used as it is as an adhesive material, a konjac smell is strong. Therefore, a paper product using the technique described in Non Patent Literature 1 cannot be used for a food container or a paper product similarly to that described in Patent Literature 1.

Solution to Problem

The present inventor has invented a food container and a paper product which are water resistant, oil resistant, and recyclable in view of the above problems.

A first invention is a food container obtained by mixing and stirring water, konjac mannan, and an alkali to liberate an acetyl group to obtain modified mannan whose swelling is suppressed, releasing suppression of swelling of the modified mannan by neutralization to obtain a neutral or acidic mannan sol, gelating the mannan sol to obtain a mannan gel, applying the mannan sol or the mannan gel to a paper food container, and drying the mannan sol or the mannan gel.

By using the food container of the present invention, it is possible to obtain a food container having water resistance while suppressing generation of a konjac smell, a harsh taste, astringency, and the like. In addition, unlike a food container that has been subjected to laminate processing or the like, the food container of the present invention can be naturally decomposed, and therefore has a lower load on the environment and can be manufactured at a lower cost than before. In addition, the food container of the present invention is disintegrated in water, and therefore is recyclable.

In the above-described invention, the food container can be configured as a food container obtained by applying the solated mannan sol or the gelated mannan gel in a thickness of at least 50 μm and drying the mannan sol or the mannan gel.

In order to ensure water resistance as a food container for containing mineral water or the like, it is preferable to apply the mannan sol or the mannan gel in a thickness of 50 μm or more as in the present invention.

In the above-described invention, the food container can be configured as a food container obtained by applying the solated mannan sol or the gelated mannan gel in a thickness of at least 100 μm and drying the mannan sol or the mannan gel.

Applying the mannan sol or the mannan gel in a thickness of 100 μm or more as in the present invention is more preferable because the number of types of containable beverages can be increased.

In the above-described invention, the food container can be configured as a food container obtained by applying the solated mannan sol or the gelated mannan gel in a thickness of at least 200 μm and drying the mannan sol or the mannan gel.

By applying the mannan sol or the mannan gel in a thickness of 200 μm or more, oil resistance can be ensured in addition to water resistance.

A fifth invention is a paper product obtained by mixing and stirring water, konjac mannan, and an alkali to liberate an acetyl group to obtain mannan whose swelling is suppressed, releasing suppression of swelling of the modified mannan by neutralization to obtain a neutral or acidic mannan sol, gelating the mannan sol to obtain a mannan gel, applying the mannan sol or the mannan gel to paper, and drying the mannan sol or the mannan gel.

A utensil required to have water resistance and oil resistance is not limited to a food container. The present invention can also be widely applied to a paper product.

In the above-described invention, the paper product can be configured as a paper product used for food.

The present invention particularly exhibits an effect in that water resistance and oil resistance are ensured without generating a konjac smell, a harsh taste, or astringency, and recycling is possible. Therefore, the paper product is preferably a paper product particularly used for food.

In the above-described invention, the paper product can be configured as a paper product including any one or more of a spoon, a fork, a pair of chopsticks, a straw, a muddler, a bag, a beverage pack, and food wrapping paper.

Examples of the paper product used for food include a product like the present invention.

Advantageous Effects of Invention

The present invention can provide a food container or a paper product having water resistance and oil resistance while suppressing generation of a konjac smell, a harsh taste, astringency, and the like. In addition, the food container or the paper product of the present invention can be naturally decomposed, and therefore has a lower load on the environment and can be manufactured at a lower cost than before. Furthermore, the food container or the paper product of the present invention is disintegrated in water, and therefore is recyclable.

BRIEF DESCRIPTION OF DRAWINGS

FIG. 1 is a table illustrating results of a water absorption test.

FIG. 2 is a table illustrating results of a water absorption test for confirming presence or absence of an influence of high temperature or low temperature.

FIG. 3 is a table illustrating results of a sensory test.

DESCRIPTION OF EMBODIMENTS

Figure 4:
FIG. 4 is a photograph illustrating a state in which a torn test sheet is put into a container containing water and left for 24 hours in a test for confirming recyclability.

As a mannan sol or a mannan gel (a konjac sol or a konjac gel) to be applied to a food container or a paper product of the present invention, a mannan sol using modified mannan manufactured by a manufacturing method disclosed in JP 6089308 B2 has an ability to gelate a sol in which an acetyl group is liberated even in an acidic to neutral pH region, has no konjac smell, harsh taste, or astringency, and therefore is preferably used. However, the present invention is not limited thereto, any mannan sol that is gelated in an acidic to neutral pH region or any mannan gel that is gelated from the mannan sol may be used.

A method for manufacturing a mannan sol or a mannan gel (a konjac sol or a konjac gel) with modified mannan to be applied to a food container or a paper product will be described.

The mannan sol is obtained by subjecting konjac mannan to an alkali treatment and a neutralization treatment. Water, an alkali, and konjac mannan are mixed. While the mixture is stirred for about one to 100 minutes, swelling is suppressed to liberate an acetyl group. Swelling is released by a neutralization treatment, and stirring is stopped when the mannan swells. Then, the mannan is caused to sufficiently swell, thus obtaining a mannan sol.

The mannan gel is obtained by heating the mannan sol.

As the konjac mannan, a mixture of one or more of ground konjac potato, konjac powder, and glucomannan obtained by washing konjac powder with an alcohol aqueous solution can be used. The variety of konjac potato is not specified, and any variety of konjac potato may be used as long as the konjac potato belongs to a genus of konjac of the aroid family including konjac mannan.

A ratio of konjac mannan to an alkaline solution is preferably 10 parts to 200 parts of water with respect to 1 part of the konjac mannan. The temperature of water is preferably 60° C. or lower.

The alkali to be added only needs to be strongly alkaline, and examples thereof include calcium hydroxide, calcined shell calcium, and eggshell calcium. The alkali amount is required to be an amount capable of liberating an acetyl group of the konjac mannan and suppressing swelling, and is larger than the alkali amount used when a normal konjac is manufactured. In a case of calcium hydroxide, the amount thereof to be added is preferably 7.6% or more with respect to the weight of the konjac mannan. The pH of the alkaline solution is preferably 11.7 or more. If the pH is too low, swelling cannot be suppressed. If the pH is too high depending on the variety and the degree of purification, suppression of swelling cannot be released in some cases. The suppression of swelling is to suppress konjac mannan's original ability (speed, viscosity, or the like) to swell. For example, when a normal konjac is manufactured using special grade konjac mannan whose variety is KONJAC and which has been manufactured in Japan, calcium hydroxide is used in an amount of about 3 to 6% with respect to the weight of the konjac mannan. By using calcium hydroxide or the like in such an amount that a swelling speed is lower or the viscosity is lower than the case of manufacturing a normal konjac, swelling of the konjac mannan is suppressed.

By liberating an acetyl group of the konjac mannan by an alkali treatment, and releasing suppression of swelling using a food in a mixed liquid of water and an alkali mixed with modified mannan whose swelling is suppressed, the mixture is caused to swell to obtain a mannan sol. The food to be used only needs to be a substance that releases suppression of swelling, and is preferably a food that lowers a pH. After the addition, when the mixture is stirred, the mixture swells in several seconds to 60 minutes to obtain a mannan sol.

When a mannan gel is manufactured, the mannan sol only needs to be heated.

The mannan sol or the mannan gel manufactured as described above is applied to paper and dried. At this time, hot air drying is preferable, but another drying method such as natural drying or vacuum drying may be used.

Then, the dried paper (paper to which the mannan sol or the mannan gel using the modified mannan is applied and dried) is molded into the shape of a desired food container. This makes it possible to obtain a food container having water resistance and oil resistance in any shape such as a dish, a cup, a bowl, or a box. In addition, by forming the paper into a shape such as a cube, a rectangular parallelepiped, or a substantially triangular pyramid, it is possible to obtain a beverage pack for containing a beverage such as milk. Furthermore, by forming the paper into a bag shape, a paper bag as an alternative to a disposable plastic bag can be formed. In addition, the dried paper can be molded into any shape such as a spoon, a fork, a pair of chopsticks, a straw, or a muddler. By molding the dried paper into a desired shape in this manner, various paper products used for food can be obtained. Furthermore, the dried paper can also be used as wrapping paper for food such as a hamburger. Note that paper to which the mannan sol or the mannan gel manufactured by the above method is applied has water resistance and oil resistance, and therefore can be used for purposes other than a food container if water resistance and oil resistance are required.

Next, the mannan sol or the mannan gel using the above-described modified mannan was applied to paper at a dilution ratio of 100 times with respect to water, and it was confirmed whether or not the paper had water resistance and oil resistance.

In order to obtain the mannan sol using the modified mannan used here, 0.91 g of konjac mannan whose variety is KONJAC and which has been manufactured in Japan and 0.09 g of calcium hydroxide are added to 100 cc of water at 12° C., and the mixed liquid is stirred for 10 minutes. Thereafter, 0.15 g of citric acid as a neutralizing agent is added thereto, and when the mixture swells, stirring is stopped, and then the mixture is left for 60 to 120 minutes to prepare a mannan sol. Then, the prepared mannan sol is applied to paper and dried. Note that 0.15 g of citric acid is added as a neutralizing agent when a neutral mannan sol is prepared, but 0.25 g of citric acid is added when an acidic mannan sol is prepared.

In order to confirm water resistance, a water absorption test using a water absorption tester was performed. As the water absorption tester, a Gurley-Cobbe size tester (standard type) manufactured by KUMAGAI RIKI KOGYO Co., Ltd. was used. As a test sheet, a base sheet and a sheet obtained by applying a mannan sol adjusted to be neutral (about pH 7.0) or acidic (about pH 4.5) to a base sheet and drying the mannan sol were used. In addition, when the mannan sol was applied to a base sheet, the mannan sol was applied in a thickness of 50.3 μm (in a case of No. 22) or 100.6 μm (in a case of No. 44) using a No. 22 coating rod or a No. 44 coating rod manufactured by KUMAGAI RIKI KOGYO Co., Ltd. In addition, a double-applied (200.12 μm=100.6 μm×2 times applied) test sheet was also used, which was obtained by applying the mannan sol once with the No. 44 coating rod, naturally drying the mannan sol, applying the mannan sol once again with the No. 44 coating rod, and naturally drying the mannan sol.

Each of the test sheets described above was placed on the water absorption tester, and was brought into contact with each liquid as a sample for 24 hours. After 24 hours, it was confirmed whether or not there was exudation to a back surface of each of the test sheets to confirm water resistance and oil resistance.

As the liquid as a sample, mineral water (pH 7.0), a coffee beverage (pH 3.70), 100% orange juice (pH 3.46), household oil (pH 6.5), sake (pH 3.71), and cola (pH 2.20) were used.

As a result, results as presented in the table of FIG. 1 were obtained. According to the table of FIG. 1, it can be found that when a mannan sol using modified mannan is applied to a base sheet in a thickness of about 50 μm or more and naturally dried, a film ensuring water resistance is formed, and water resistance can be thereby obtained. In addition, when a mannan sol using modified mannan is applied to a base sheet in a thickness of about 100 μm or more and naturally dried, water resistance can be obtained in many cases. Furthermore, when a mannan sol using modified mannan is applied to a base sheet in a thickness of about 200 μm or more and naturally dried, not only water resistance but also oil resistance can be ensured.

In addition, in order to confirm presence or absence of an influence of high temperature or low temperature, water resistance and oil resistance were confirmed similarly using a 98° C. high temperature coffee beverage, a 98° C. high temperature tea, vanilla ice cream, and a normal temperature tea as samples. As a result, results as presented in the table of FIG. 2 were obtained.

According to the table of FIG. 2, even in this case, when a mannan sol using modified mannan is applied in a thickness of about 50 μm or more and naturally dried, water resistance can be obtained, and when a mannan sol using modified mannan is applied in a thickness of about 100 μm or more and naturally dried, water resistance can be obtained in many cases.

Furthermore, it was confirmed by a sensory test whether or not a konjac smell, a harsh taste, astringency, and the like transferred to food by applying a mannan sol using modified mannan to a base sheet. In this sensory test, mineral water was put into three types of food containers: a paper food container obtained by applying a mannan sol using modified mannan adjusted to be neutral (pH 7.0) and naturally drying the mannan sol for three days; a paper food container obtained by applying a mannan sol using modified mannan adjusted to be acidic (pH 4.09) and naturally drying the mannan sol for three days; and a paper food container to which nothing was applied, and sensory test cooperators confirmed whether or not there was a difference in astringency, bitterness, odor, and taste. The sensory test cooperators were twelve females (one person in twenties, six persons in thirties, two persons in forties, and three persons in fifties) and three males (one person in twenties and two persons in thirties).

Results of the sensory test are presented in the table of FIG. 3. According to the table of FIG. 3, for the food container obtained by applying a mannan sol using modified mannan adjusted to be neutral and drying the mannan sol, 80% of the sensory test cooperators have answered that there is no difference from mineral water, and this indicates that an influence is smaller than that of the paper food container (about 67%) to which nothing is applied. In addition, also for the food container obtained by applying a mannan sol using modified mannan adjusted to be acidic and drying the mannan sol, about 53% of the sensory test cooperators have answered that there is no difference from mineral water.

Therefore, it is clear that generation of a konjac smell, a harsh taste, astringency, and the like is suppressed, and particularly when neutral modified mannan is used, a higher effect is exhibited than when nothing is applied.

Furthermore, a test was performed in order to confirm whether or not a paper (test sheet) to which a mannan sol using modified mannan was applied was recyclable. In this test, as a test sheet, a mannan sol using modified mannan adjusted to be neutral (pH 7.0) was applied to one surface of each of ten sheets of general copy paper and three sheets of thick paper (280 mg/m$^2$) in a thickness of 50.3 μm with the coating rod No. 22.

Then, the test sheets were torn by hand, put into one container containing water, and left for 24 hours. This is illustrated in FIG. 4. Here, copy paper and thick paper as the test sheets are mixed and put into one container, which is a reproduction of the fact that various types of paper are mixed and put into one container containing water in actual recycling.

Figure 5:
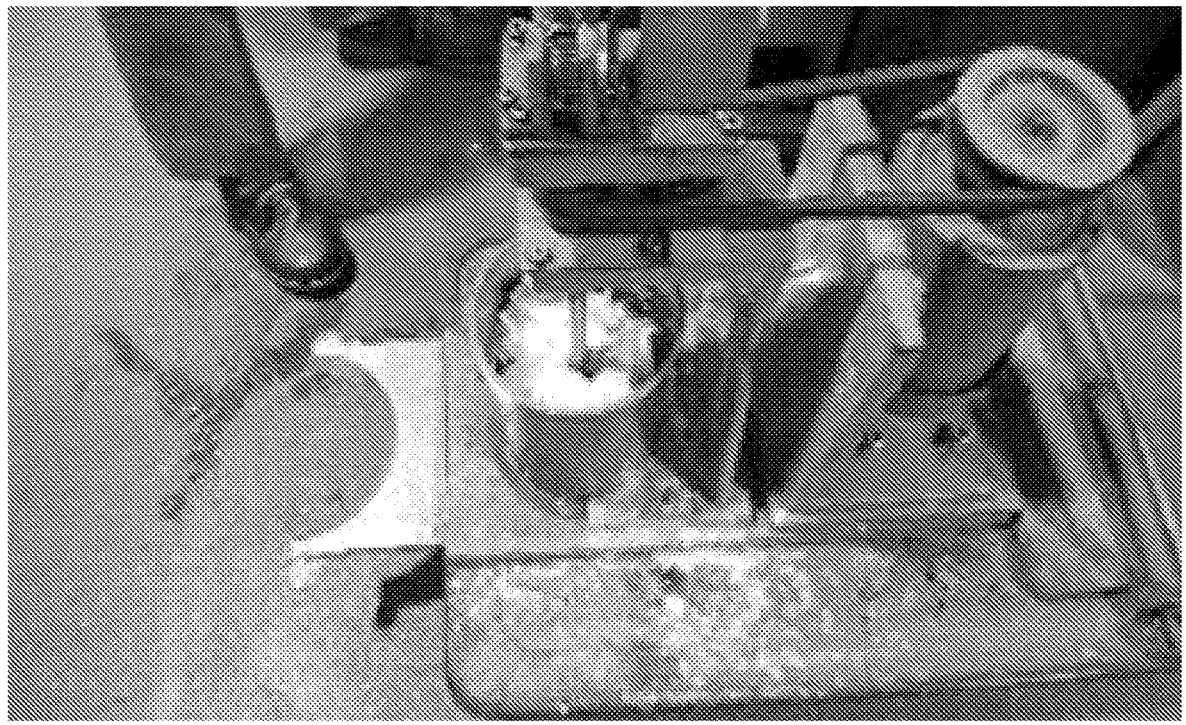
FIG. 5 is a photograph illustrating a state in which a test sheet that has been immersed in water for 24 hours is put into a pulp disintegrator.

The test sheets that had been immersed in water for 24 hours was taken out from the container, and lightly squeezed. Thereafter, 50 g of the test sheets (test sheets immersed in water in a torn state) were put into a pulp disintegrator together with 2 L of water and disintegrated for three minutes. FIG. 5 illustrates a state in which the test sheets are put into the pulp disintegrator. As the pulp disintegrator, a standard pulp disintegrator (with a continuously variable transmission) "KRK 2530" manufactured by KUMAGAI RIKI KOGYO Co., Ltd. was used.

Figure 6:
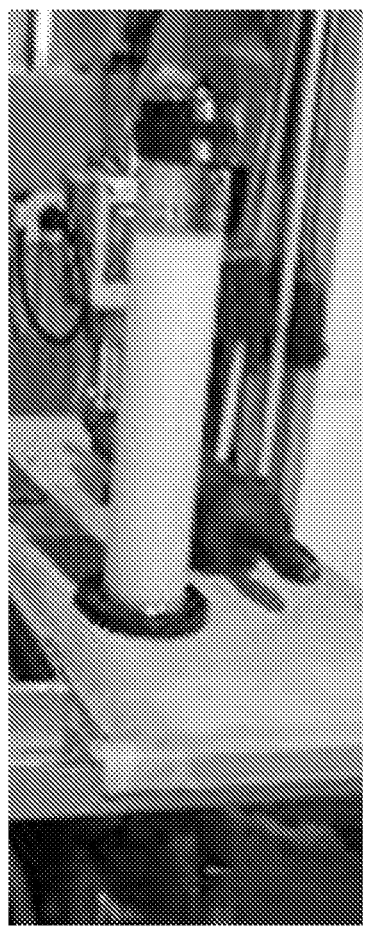
FIG. 6 is a photograph illustrating a state in which a test sheet is disintegrated.
Figure 7:
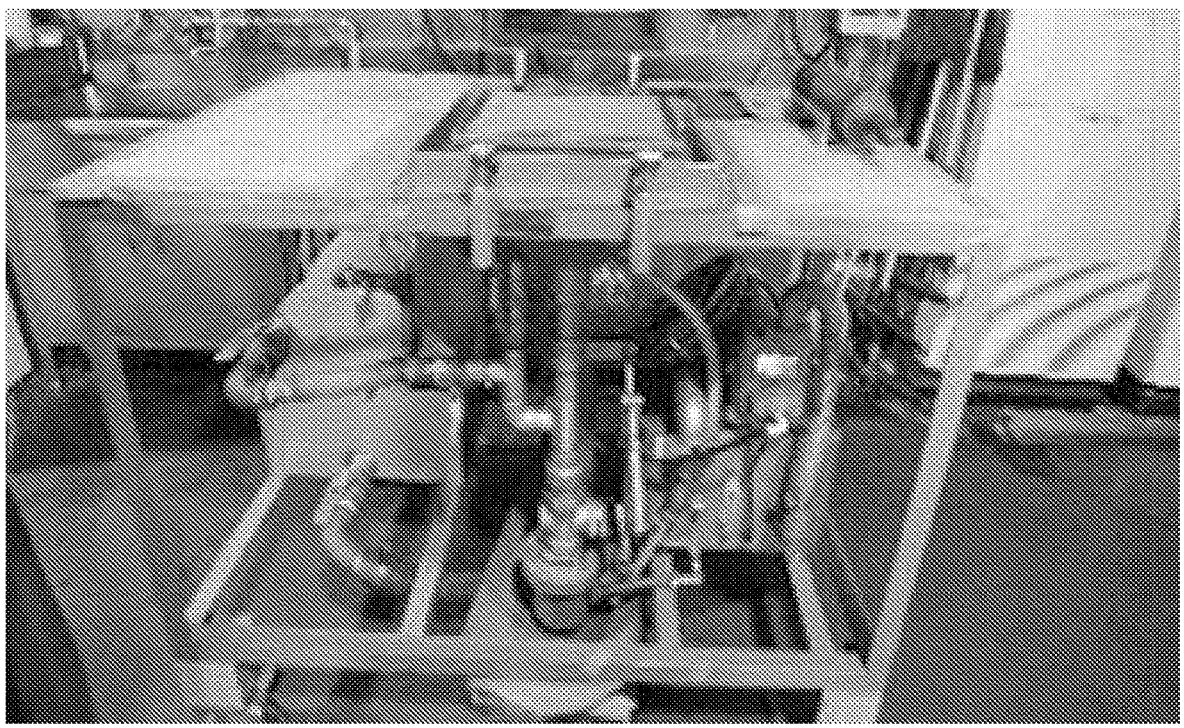
FIG. 7 is a photograph illustrating a state in which a mixed liquid in which water and a test sheet are mixed is put into a sheet machine.
Figure 8:
FIG. 8 is a photograph illustrating a state in which paper is made by a sheet machine.

The test sheets were put into the disintegrator, and the test sheets were disintegrated in 2 L of water. Then, 3 L of water was further put into the liquid in which the test sheets were disintegrated in water. This state is illustrated in FIG. 6. In this way, 1 L of liquid was taken out from the liquid in which the test sheets disintegrated in 5 L of water were mixed, and put into a square sheet machine. This state is illustrated in FIG. 7. As the sheet machine, a square sheet machine "KRK 2555" manufactured by KUMAGAI RIKI KOGYO Co., Ltd. was used. FIG. 8 illustrates a state in which paper is made by the sheet machine.

Figure 9:
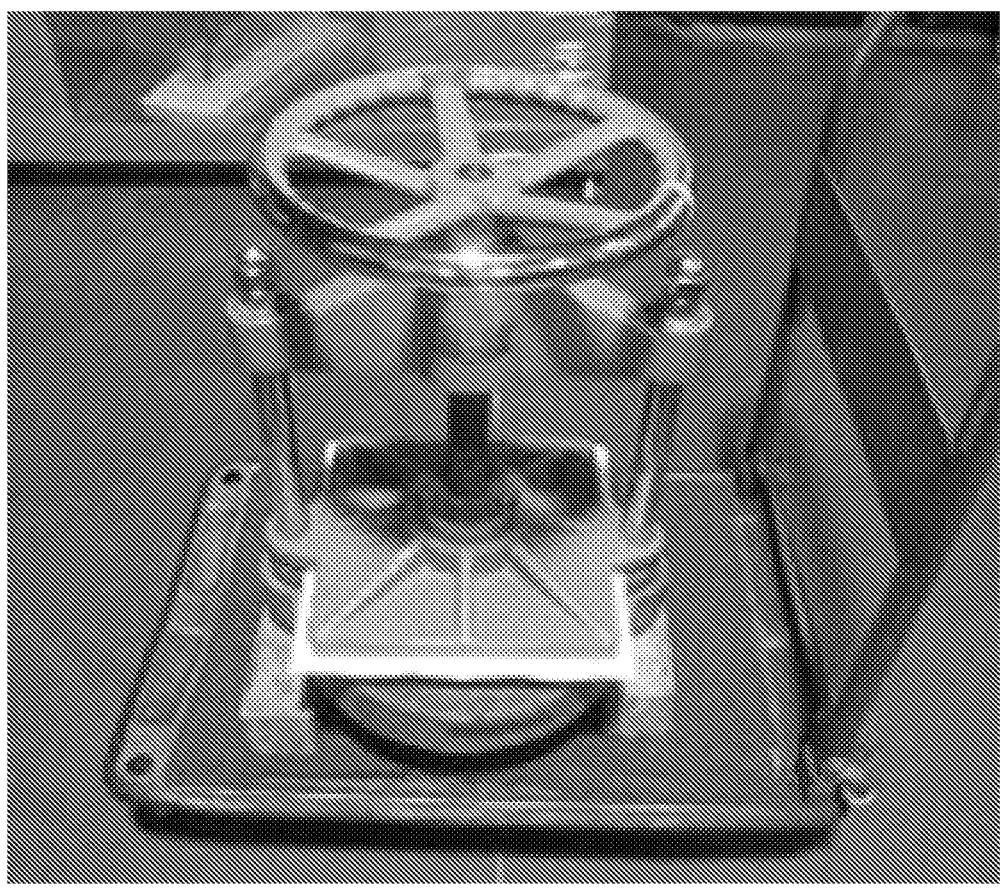
FIG. 9 is a photograph illustrating a state in which made paper is pressed by a press machine.
Figure 10:
FIG. 10 is a photograph illustrating a state in which made paper is pressed and then put into a dryer.

Then, the made paper was pressed by a press machine and put into a dryer. FIG. 9 illustrates a state in which the made paper is pressed by the press machine, and FIG. 10 illustrates a state in which the made paper is put into the dryer after being pressed. As the press machine, a square sheet machine press "KRK2570" manufactured by KUMAGAI RIKI KOGYO Co., Ltd. was used. As the dryer, a rotary dryer "KRK 2575" manufactured by KUMAGAI RIKI KOGYO Co., Ltd. was used.

Figure 11:
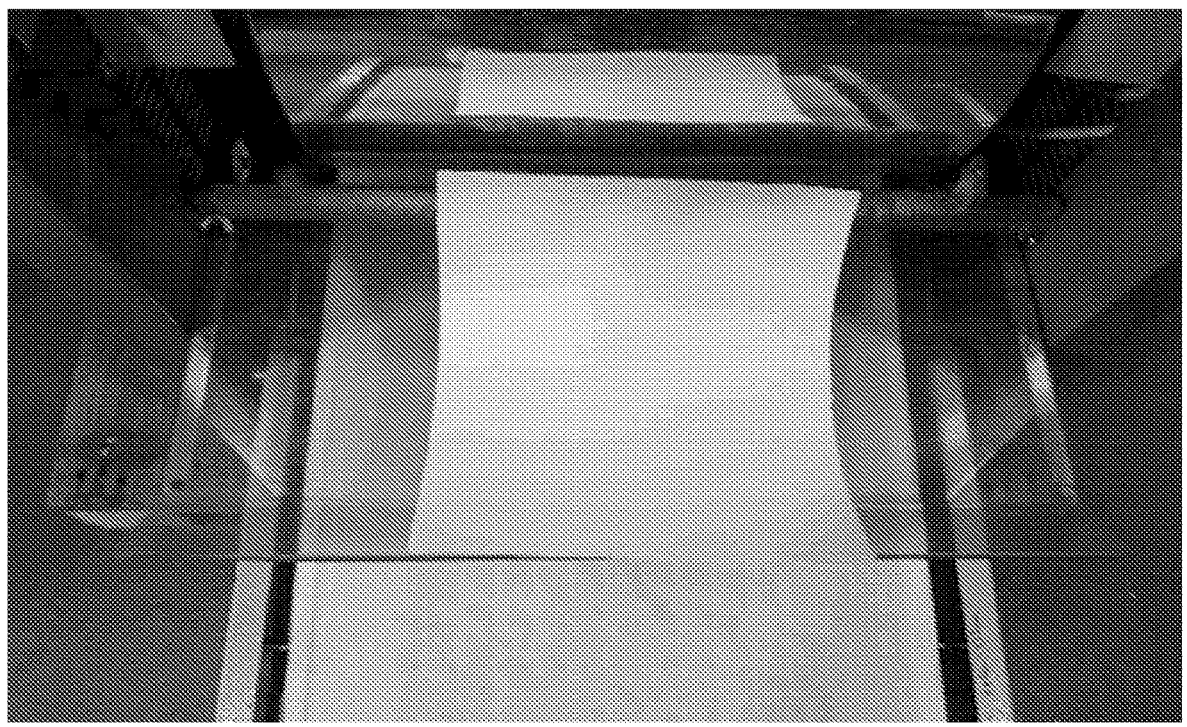
FIG. 11 is a photograph illustrating a state in which recycled paper is discharged from a dryer.

FIG. 11 illustrates a state in which recycled paper is discharged from the dryer. The recycled paper was weighed, and one sheet thereof weighed 3.9 g.

From the above results, it has been confirmed that it is sufficiently possible to recycle paper even when a mannan sol using modified mannan is applied to the paper.

INDUSTRIAL APPLICABILITY

The present invention can provide a food container or a paper product having water resistance and oil resistance while suppressing generation of a konjac smell, a harsh taste, astringency, and the like. In addition, the food container or the paper product of the present invention can be naturally decomposed, and therefore has a lower load on the environment and can be manufactured at a lower cost than before. Furthermore, the food container or the paper product of the present invention is disintegrated in water, and therefore is recyclable.

The invention claimed is:

1. A food container comprising a base paper and a coating formed on the base paper, the coating being formed by mixing and stirring water, konjac mannan, and an alkali to liberate an acetyl group to obtain modified mannan, adding a neutralizing agent to the modified mannan of which swelling is suppressed, applying a swollen neutral or acidic mannan sol to the base paper, and drying the base paper.

2. The food container according to claim 1, wherein the coating is formed by applying the mannan sol in a thickness of at least 50 μm and drying the mannan sol.

3. The food container according to claim 1, wherein the coating is formed by applying the mannan sol in a thickness of at least 100 μm and drying the mannan sol.

4. The food container according to claim 1, wherein the coating is formed by applying the mannan sol in a thickness of at least 200 μm and drying the mannan sol.

5. A paper product comprising a base paper and a coating formed on the base paper, the coating being formed by mixing and stirring water, konjac mannan, and an alkali to liberate an acetyl group to obtain modified mannan, adding a neutralizing agent to the modified mannan of which whose swelling is suppressed, applying a swollen neutral or acidic mannan sol to the base paper, and drying the base paper.

6. The paper product according to claim 5, wherein the paper product is a food grade paper product.

7. The paper product according to claim 6, wherein the paper product is at least one of a spoon, a fork, a pair of chopsticks, a straw, a muddler, a bag, a beverage pack, and food wrapping paper.

* * * * *